INVENTOR
LYNNE E. WINDSOR
BY
ATTORNEY

July 9, 1968  L. E. WINDSOR  3,391,671
APPARATUS FOR PLACING ADHESIVE ON FROST SHIELDS
Filed April 10, 1964  2 Sheets-Sheet 2

INVENTOR
LYNNE E. WINDSOR
BY
ATTORNEY

United States Patent Office 3,391,671
Patented July 9, 1968

3,391,671
APPARATUS FOR PLACING ADHESIVE ON
FROST SHIELDS
Lynne E. Windsor, Winnipeg, Manitoba, Canada, assignor
to James B. Carter Limited, Winnipeg, Manitoba,
Canada
Filed Apr. 10, 1964, Ser. No. 358,859
2 Claims. (Cl. 118—6)

My invention relates to new and useful improvements in apparatus for the manufacture of frost shields which are used for the prevention of frost formation and condensation on automobile windows and the like.

The conventional means of manufacturing such frost shields consists of stamping out the plastic frost shields which normally are rectangular when viewed in plan and are provided with semi-circularly curved ends. A gasket of rubber or similar material of substantially rectangular cross section is covered on two opposing sides with a suitable adhesive.

One side bonds the gasket to the transparent plastic sheet forming the frost shield, and the other side, covered with a strip of polyethylene plastic, which is removed before installation, adheres the shield to the automobile window glass.

It has been found that considerable difficulty attends the maintenance of quality in such manufacture because, for example, stresses in the rubber gasket cause it to slip or slide on the plastic sheet, and covering the gasket around the perimeter of the plastic causes wrinkles and sliding of the polyethylene protective strip. This in turn exposes the adhesive surface which sticks to the packaging envelope thus ruining the quality of the product.

Furthermore the manufacture of gaskets under known processes is relatively expensive and time consuming, labor costs are high in placing the gasket upon the frost shield, shipping is complicated and requires special care.

These faults and others have been overcome by the provision of a plastic frost shield around the edge of which is extruded a ribbon of adhesive which is relatively non-curing and pressure sensitive. This ribbon of adhesive is then merely protected by a relatively thin sheet of clear plastic which is non-adhering and installation is effected by peeling off this thin plastic sheet and pressing the side of the frost shield having the adhesive ribbon, against the window glass so that an effective seal is formed.

This plastic frost shield is mounted upon a template which is rotated in synchronization with a nozzle extruding the adhesive around the edge as it passes thereunder.

The principal object and essence of the invention is therefore to provide a means for applying a ribbon of permanently pressure sensitive elastomeric material around the perimetrical edge of one side of a plastic frost shield.

Another object of the invention is to provide a device of the character herewithin described which enables the edge of the plastic windshield to pass under the extruding nozzle at a constant of speed so that the required amount of adhesive is deposited upon the perimetrical edge.

Another object of the invention is to provide a device of the character herewithin described which includes means to move the extruding nozzle into and out of position above the perimetrical edge at the beginning and end of the rotation of the template carrying the frost shield.

Another object of the invention is to provide a device of the character herewithin described in which stopping and starting of the adhesive laying is controlled by the rotation of the template.

Yet another object of the invention is to provide a device of the character herewithin described which is simple in construction, economical in manufacture, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which.

In the drawings like characters of reference indicate corresponding parts in the different figures.

Figure 1:
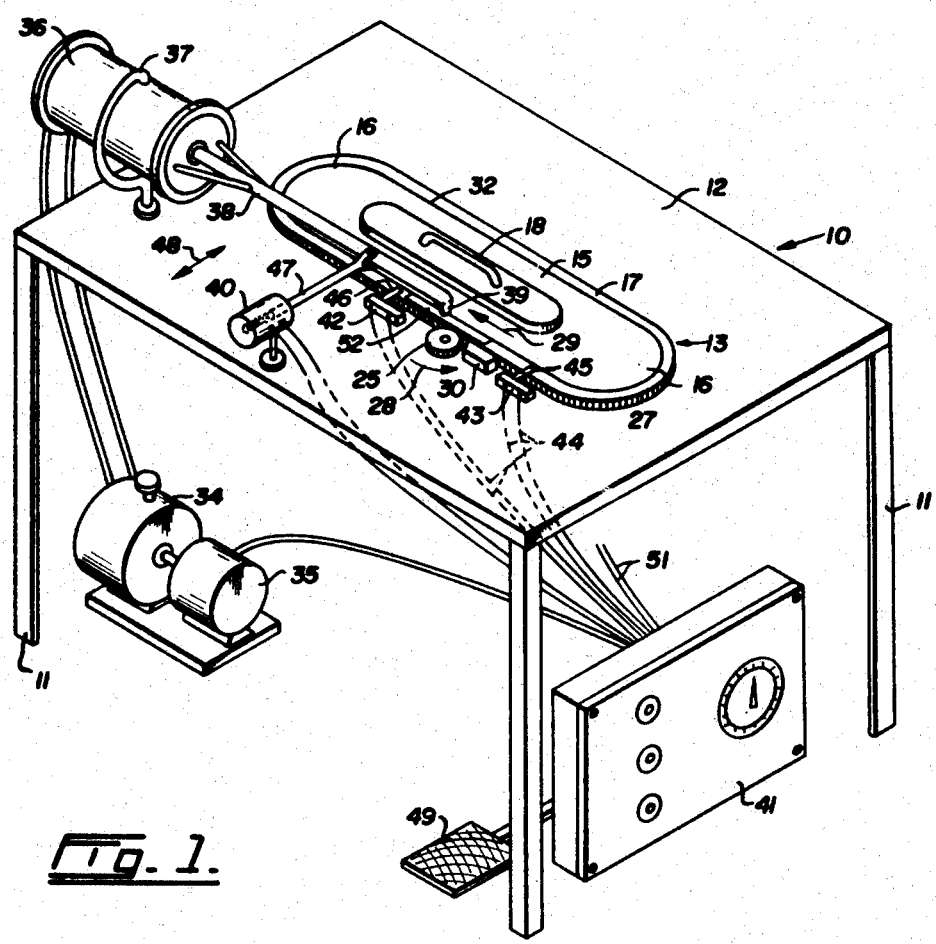
FIGURE 1 is an isometric view of the layout of the device.

Proceeding therefore to describe my invention in detail, reference character 10 illustrates generally, supporting structure including legs 11 and a planar upper surface or table 12.

A template or platen collectively designated 13 is mounted for rotation upon the upper surface 12 and is operatively connected for rotation to a source of power 14 which is situated below the upper surface, said operative connection being described subsequently, Conventional frost shields 15 are normally stamped from a sheet of clear plastic and are substantially rectangular when viewed in plan, having semi-circularly curved ends 16 and the platen or template is of similar configuration to the frost shield which is rested upon the upper surface 17 of the platen and maintained in place by a weighted plate 18 as illustrated in FIGURE 1.

Figure 2:
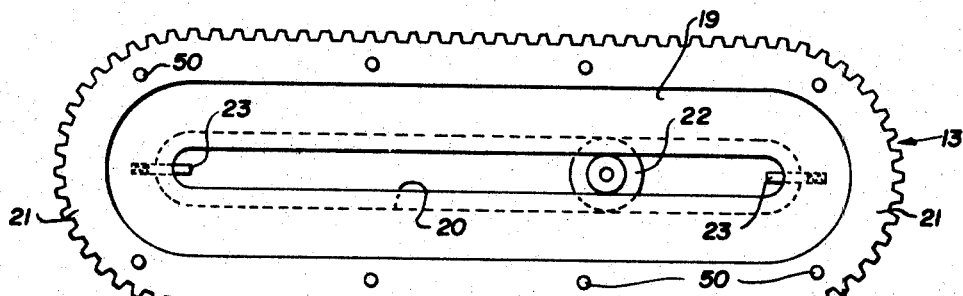
FIGURE 2 is an enlarged underside view of the template per se.
Figure 3:
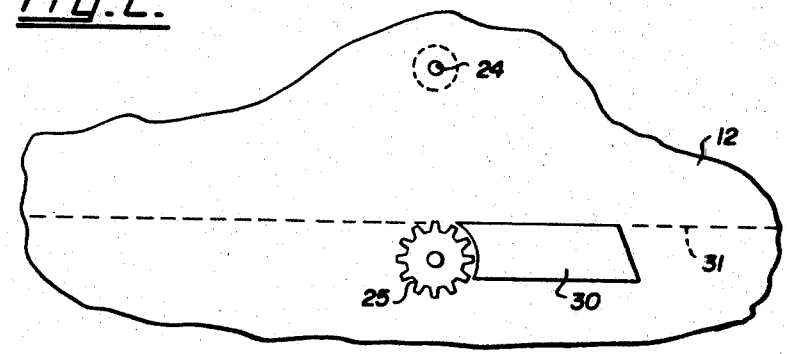
FIGURE 3 is an enlarged fragmentary view of the under surface of the table showing the drive means for the template.

It will therefore be appreciated that means are provided to rotate this platen together with the frost shield resting thereon and FIGURE 2 shows the deails of the underside of the platen or template construction.

The central area 19 of the underside is recessed and an elongated anti-friction bearing carrying recess 20 is formed along the longitudinal axis of the platen and also upon the underside, the extremities of said recess lying substantially upon the radius centers of the ends 21 of the platen.

An anti-friction bearing 22 is seated within the recess and is slidable therealong and spring loaded pins 23 are situated within each end of the recess and act as shock absorbers as the platen reaches the extremities of its travel.

A bearing pin 24 extends upwardly from the upper surface or table 12 and the anti-friction bearing 22 engages over this bearing pin and rotates thereon.

It is necessary to provide a positive drive between the source of power 14 and the template 13 in order that the extrusion process may be synchronized and this is accomplished by a spur gear 25 journalled for rotation in a horizontal plane above the upper surface 12 and connected to the source of power 14 by means of a gear reduction unit 26.

A rack gear 27 is formed around the edge of the template 13 and when the bearing 22 is mounted upon pin 24, the rack gear 27 engages the spur gear 25.

Rotation of the spur gear in the direction of arrow 28 causes the template to move in the direction of arrow 29. A guide block 30 is situated in advance of the spur gear 25 and in alignment with the track 31 along which it is desired the edge of the platen move and the rack gear 27 bears against the guide block 30 and this in conjunction with the location of the bearing pin 24, causes the edge of the platen to travel around a full rotation, the bearing 22 sliding within the recess 20 on the underside of the template.

Figure 4:
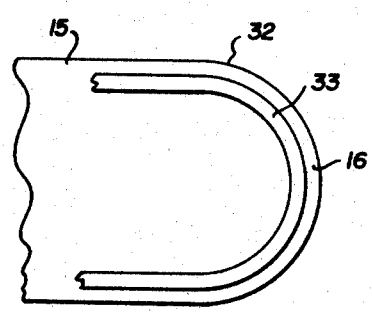
FIGURE 4 is a plan view of one end of a plastic frost shield showing the ribbon of adhesive thereon.
Figure 6:
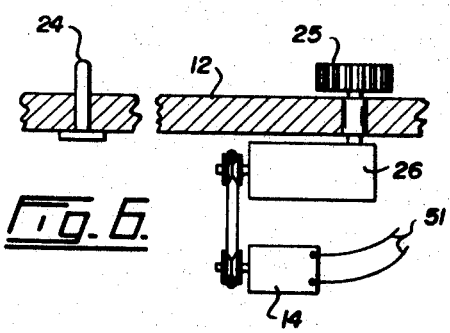
FIGURE 6 is a fragmentary enlarged sectional detail showing the method of drive for the spur gear in relation to the mounting pin.

The adhesive used is relatively permanently pressure sensitive elastomeric material such as uncured synthetic rubber or the like and is extruded in a thin ribbon around the perimetrical edge 32 of the frost shield panel 15 but spaced inwardly from the extreme edge 16 as clearly shown in FIGURE 4 and it should be stressed that by the term perimetrical edge, I intend the adhesive ribbon 33 to be spaced just inwardly from the extreme edge 16.

I have provided an hydraulic pump unit 34 driven by a source of power 35, said pump unit being connected to an extrusion cylinder 36 which is journalled for limited swinging movement in a horizontal plane upon trunnion bearings 37 mounted upon the upper surface 12 of the supporting structure 10.

An extruding conduit 38 extends from the end of the cylinder 36 which carries the elastomeric adhesive, and an extruding nozzle 39 is situated upon the extremity of the conduit 38 and extends downwardly and is situated just above the surface of the template 13.

Figure 5:
FIGURE 5 is a section of FIGURE 4.

The construction of the cylinder 36 is conventional inasmuch as it includes a plunger (not illustrated) which is driven towards the conduit 38 by means of the hydraulic pump 34 thus maintaining a constant pressure upon the adhesive carried within the cylinder 36 so that it is extruded at a constant rate in the form of a ribbon having substantially rectangular cross section as shown in FIGURE 5. To this end the discharge nozzle is preferably a transverse slit within the nozzle 39.

Because of the nature of the material it is necessary to move the nozzle 39 into position above the frost shield at the start of rotation of the template and out of position at the end of rotation in order to prevent gaps and/or lumps of adhesive being formed upon the surface of the plastic frost shield.

In this connection I have provided a spring loaded solenoid assembly 40 mounted upon the upper surface 12 connected to a main control box 41 situated adjacent the supporting surface.

This control box also controls the source of power 35 and the source of power 14 and is preferably a conventional variable speed control and reverse unit, the construction of which is well known in commercial practice.

The solenoid 40 is operated by microswitches 42 and 43 situated upon the upper surface one upon each side of the spur gear 25 and connected via electrical condiuts 44 to the control unit 41.

Microswitch contacting pins 45 and 46 are situated upon the template 13 and extend beyond the edge thereof so that as the template is rotated, the microswitches 42 and 43 are operated.

The solenoid 40 is connected by a link 47 to adjacent the end of the extrusion conduit 38 and movement in the direction of the double headed arrow 48 moves the nozzle 39 into and out of the adhesive laying position with relation to the frost shield panel 15.

A foot pedal 49 is connected to the control box 41 and controls the stopping and starting of the device and the cycle of operation is as follows.

When the pedal 49 is tripped, the template 13 commences movement in the direction of arrow 29. At the same time material is extruded from the nozzle 39. For the first few inches of movement, the template 13 picks up the necessary speed to enable the extrusion to proceed at which time pin 46 trips microswitch 42 and moves the nozzle 39 into the extruding position above the perimeter of the frost shield 15.

The template revolves through 360° and pin 46 once again trips microswitch 42 which moves the nozzle 39 out of position above the frost shield 15 and at the same time reverses the motion of template 13 so that it backs up a few inches until pin 45 strikes microswitch 43 and stops the action. The template is thus being situated ready for the next cycle to commence and it should be noted that microswitch 43 only actuates when the template is travelling in the direction opposite to arrow 29 and that microswitch 42 has a double acting contact, the first one moving the solenoid and nozzle to the extruding position and the second time moving the solenoid and nozzle out of the extruding position and reversing the motion of the template.

A plurality of plastic bearing buttons 50 are situated upon the underside of the template 13 and these buttons support the template upon the upper surface 12 for sliding motion.

The source of power 14 is connected by electrical conduits 51 to the aforementioned control box 41.

The type of adhesive material used prevents a mechanical cutoff from being used at the nozzle 39 so that it is desirable to provide a strip of material such as silicone paper 52 upon the template and to one side of the frost shield 15 so that the beginning and end of the extrusion cycle takes place upon the silicone paper which is nonadhesive to the adhesive used.

When the bead 33 has been extruded upon the surface of the frost shield, it is merely necessary to cover same with a nonadhesive sheet of silicone paper or the like which remains on until it is desired to install the frost shield at which time this sheet is peeled off and the frost shield pressed to the window glass with the adhesive 33 in contact therewith.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. In a machine for applying a layer of adhesive to the marginal edge portion of a substantially elongated and round-ended panel, the combination of a horizontal supporting table, a substantially elongated and round-ended panel supporting template movably positioned on said table and provided at its marginal edge with a toothed rack, a rotatable drive pinion provided at a fixed point on said table and meshing with said toothed rack, guide means on the table engaging said template to maintain the rack in mesh with said drive pinion and to guide the template along a predetermined endless path when the pinion is rotated, an adhesive dispenser pivotally mounted on said table for horizontal swinging movement and having an outlet nozzle movable between an operative position above said template and an inoperative position at one side of the template, a solenoid mounted on said table and operatively connected to said dispenser for moving said outlet nozzle between its two positions, motor-driven means for pressurizing adhesive in said dispenser to discharge the same through said nozzle, a reversible motor drive for said pinion whereby said template may be moved selectively forwardly and rearwardly along said endless path with reference to an initial position, manually actuated control means for energizing said reversible motor drive to move said template forwardly from its initial position and for simultaneously energizing said pressurizing means, a first detent provided on said template, a first microswitch mounted on said table in the path of movement of said first detent, said first microswitch being operatively in circuit with said solenoid and with said reversible motor drive to move said outlet nozzle to its operative position when the template has started to move forwardly from its initial position and to move the nozzle to its inoperative position and simultaneously reverse said motor drive when the templet has traveled around its endless path beyond the initial position, a second detent provided on the template, and a second microswitch mounted on said table in the path of movement of the second detent for actuation of the second microswitch only when the templet moves rearwardly to the initial position, said second microswitch being operative to discontinue the motor drive at the initial position of the templet, said template guide means including a fulcrum element provided at a fixed point on said table in spaced relation from said drive pinion, said template being formed with a longitudinal guide slot having closed ends and slidably receiving said fulcrum element, together with a pair of spring-biased shock absorbing members slidably mounted in the template at the ends of said slot, said shock absorbing members being engageable by said fulcrum element.

2. The machine as defined in claim 1 together with a set of downwardly projecting glide pins provided at the underside of said template and slidably engaging said table.

References Cited

UNITED STATES PATENTS

| | | | |
|---|---|---|---|
| 2,316,959 | 4/1943 | Hinkley et al. | 118—321 |
| 2,419,951 | 5/1947 | Kastel | 118—321 X |
| 2,731,946 | 1/1956 | Birkland | 118—409 X |
| 2,867,189 | 1/1959 | Dawson | 118—409 |
| 2,880,697 | 4/1959 | Blanding et al. | 118—8 X |

MORRIS KAPLAN, *Primary Examiner.*